(12) United States Patent
Gutschner et al.

(10) Patent No.: US 7,523,974 B2
(45) Date of Patent: Apr. 28, 2009

(54) MOTOR VEHICLE WITH AN ATTACHMENT DEVICE FOR A SEPARATING OR RETAINING ELEMENT

(75) Inventors: Andreas Gutschner, Markgröningen (DE); Benno Gayer, Vaihingen/Enz (DE); Klaus Luik, Mühlacker (DE)

(73) Assignee: Dr. Ing. h.c. F. Porsche Aktiengesellschaft, Weissach (DE)

( * ) Notice: Subject to any disclaimer, the term of this patent is extended or adjusted under 35 U.S.C. 154(b) by 220 days.

(21) Appl. No.: 11/645,826

(22) Filed: Dec. 26, 2006

(65) Prior Publication Data

US 2007/0144107 A1  Jun. 28, 2007

(30) Foreign Application Priority Data

Dec. 23, 2005  (DE) ........................ 10 2005 062 380

(51) Int. Cl.
*B60R 13/02* (2006.01)
(52) U.S. Cl. ..................................... 296/1.08
(58) Field of Classification Search ................ 296/1.08, 296/191, 29, 43, 1.04; 160/368.1, 369
See application file for complete search history.

(56) References Cited

U.S. PATENT DOCUMENTS

| 6,302,463 | B1 * | 10/2001 | Moore et al. ............. 296/24.43 |
| 6,325,436 | B1 * | 12/2001 | Ehrenberger et al. ........ 296/24.4 |
| 6,460,912 | B2 * | 10/2002 | Moore et al. ............. 296/24.43 |
| 6,467,828 | B1 * | 10/2002 | Grydbeck et al. ......... 296/24.43 |
| 6,983,970 | B2 * | 1/2006 | Bateman ................... 296/24.43 |
| 7,281,742 | B2 * | 10/2007 | Porter et al. ................ 296/24.4 |
| 2003/0057724 | A1 * | 3/2003 | Inagaki et al. .............. 296/37.8 |
| 2003/0122394 | A1 * | 7/2003 | Hashimoto ................. 296/24.1 |
| 2006/0208518 | A1 * | 9/2006 | Ament et al. ............ 296/37.16 |
| 2007/0057499 | A1 * | 3/2007 | Fengel et al. ............... 280/749 |

FOREIGN PATENT DOCUMENTS

| DE | 197 48 595 A1 | 5/1999 |
| DE | 299 18 825 U1 | 3/2000 |
| DE | 103 09 173 A1 | 9/2004 |

* cited by examiner

*Primary Examiner*—H Gutman

(57) ABSTRACT

A motor vehicle has a body shell section, an interior trim part covering the body shell section and an attachment device for a separating or retaining element in particular a luggage grille. The attachment device has a mounting part secured to the body shell section with an attachment section and a holding device. The interior trim part has a hole, into which a cover is inserted, through which the holding section passes. In order to be able to reduce rattling noises, the cover is attached exclusively to the interior trim part and lies at a distance from the body shell section. An extension section is additionally provided between the holding section realized as a hook and the attachment section, in conjunction with which the hook is provided with a covering made of plastic executed as a push-on part, which together with the cover conceals the attachment device.

12 Claims, 3 Drawing Sheets

MOTOR VEHICLE WITH AN ATTACHMENT DEVICE FOR A SEPARATING OR RETAINING ELEMENT

CROSS-REFERENCE TO RELATED APPLICATION

This application claims the priority, under 35 U.S.C. §119, of German application DE 10 2005 062 380.8, filed Dec. 23, 2005; the prior application is herewith incorporated by reference in its entirety.

BACKGROUND OF THE INVENTION

Field of the Invention

The invention relates to a motor vehicle with an attachment device for a separating or retaining element. The attachment device has a mounting part secured to a body shell section of the vehicle with an attachment section and a holding device. A vehicle interior trim part has a hole, into which a cover is inserted, through which the holding section passes.

A category-defining motor vehicle is disclosed in German Utility patent DE 299 18 825 U1. The vehicle possesses a body shell section, to which a retaining element, for example a luggage net, can be secured via an attachment device. The attachment device has for this purpose a mounting part, which is executed as a sheet metal part and exhibits an attachment section for connecting to a body shell section and a securing section. The retaining element is suspended from the securing section, which is executed as an eye in this case. Also allocated to the body shell section is an inner trim part, which exhibits a hole, into which there is inserted a cover which is penetrated by the securing section. The funnel-shaped cover engages with the inner trim part and is also supported on the body shell section. If a retaining element is suspended from the securing element, rattling noises can arise while the vehicle is in motion under certain circumstances.

SUMMARY OF THE INVENTION

It is accordingly an object of the invention to provide a motor vehicle with an attachment device for a separating or retaining element that overcomes the above-mentioned disadvantages of the prior art devices of this general type.

The advantages that are primarily achieved with the invention can be appreciated from the fact that the occurrence of rattling noises is at least significantly reduced by the measures according to the invention, since the cover does not come into contact with the body shell section, and because the hook, from which the retaining element can be suspended, is screened by the pushed-on covering and does not come into direct contact with the retaining element. The cover also conceals the hole in the interior trim part, so that the body shell section is covered and only the hook is accessible. The retaining element also passes through the extension section between the hook and the attachment section at a distance from the body shell section, with the intention that rattling noises are also be avoided by this measure. In addition, the push-on part and the cover are readily replaced in the event of repairs.

According to an illustrative embodiment, it is advantageous for the push-on part to be capable of being pushed onto the hook without problem. A further reduction in rattling noises is also possible through the choice of material for the push-on part according to the invention.

In a further illustrative embodiment, the cover can simply be inserted into the hole and, in addition, the occurrences of rattling noises are further reduced. The cover can be manufactured from an elastomer or polypropylene or, if necessary, as a two-component part thereof.

A simple attachment possibility for the cover is further envisioned.

According to one further development of the invention, it is advantageous for the holding section and the extension section to be capable of being dimensioned so that the hook does not project beyond the interior trim part, but instead terminates inside the roof section.

A collar on the push-in part closes off the hole in the cover.

Other features which are considered as characteristic for the invention are set forth in the appended claims.

Although the invention is illustrated and described herein as embodied in a motor vehicle with an attachment device for a separating or retaining element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
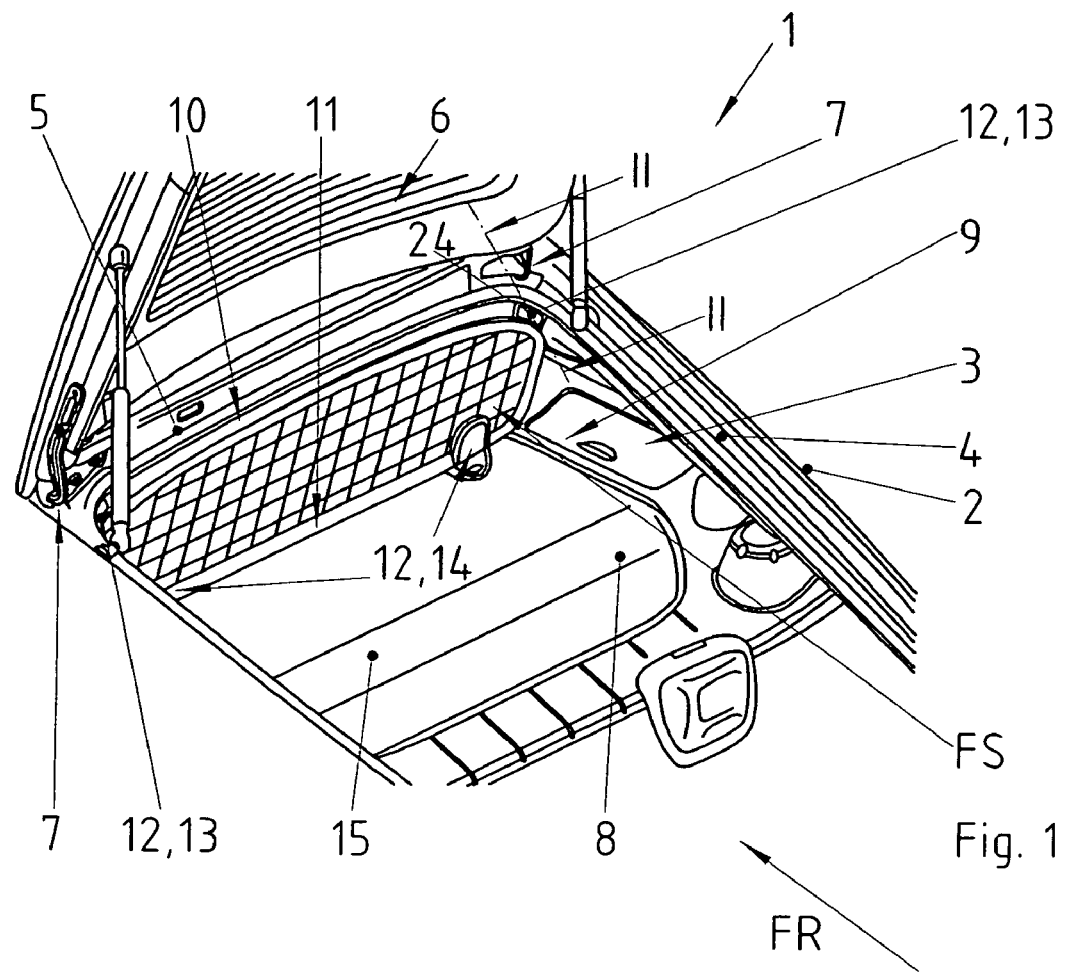
FIG. 1 is a diagrammatic, perspective view of a motor vehicle having an attachment device for a retaining element according to the invention.
Figure 2:
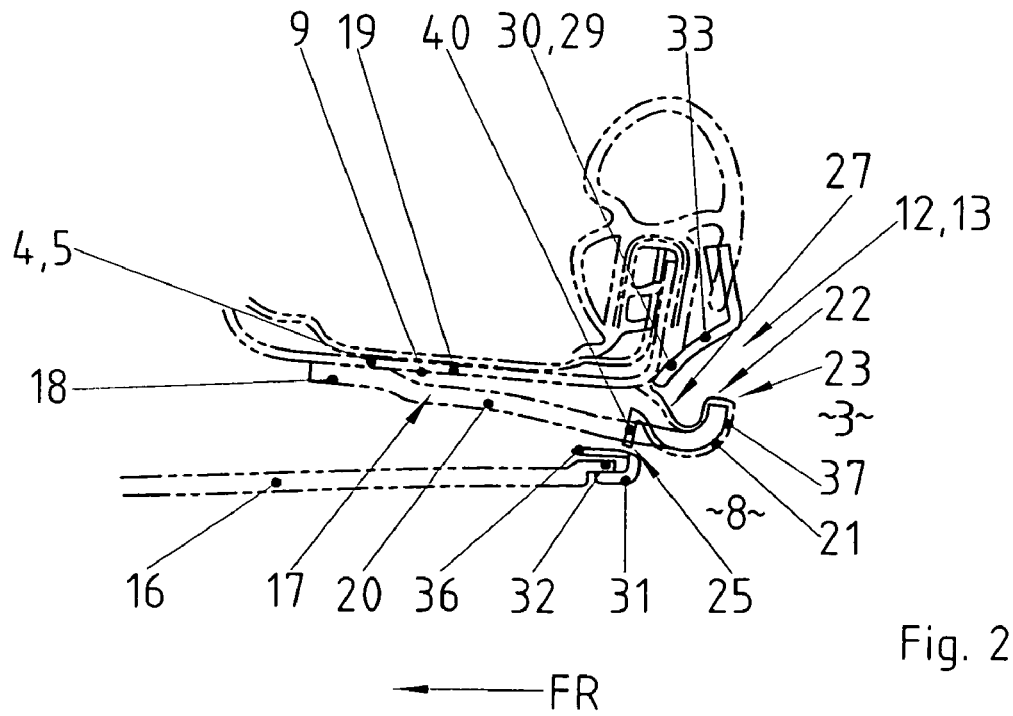
FIG. 2 is a diagrammatic, sectional view taken along the line II-II shown in FIG. 1.
Figure 3:
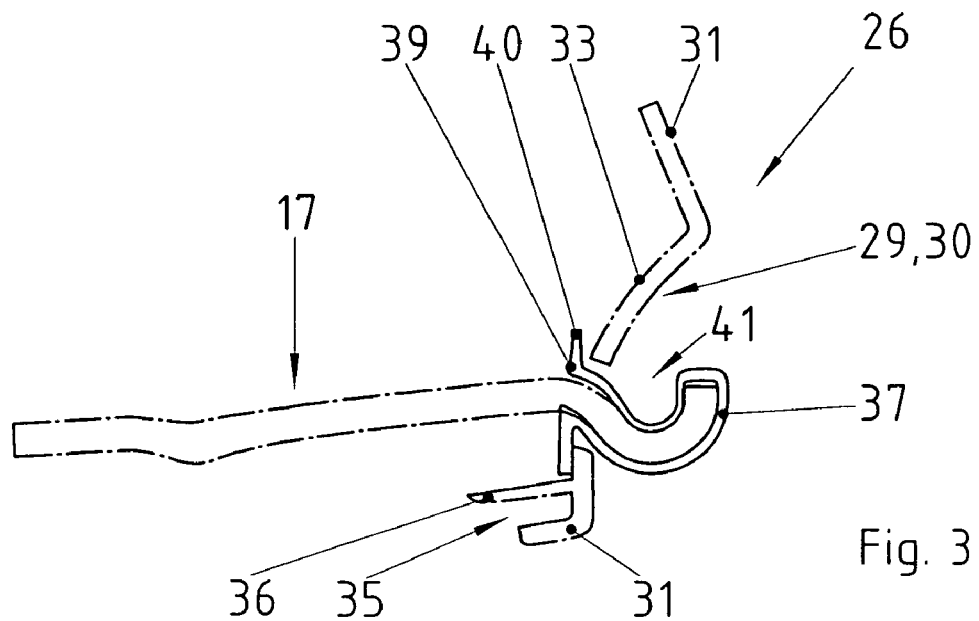
FIG. 3 is a diagrammatic, enlarged sectional view of the attachment device with a first illustrative embodiment of a push-on part for the attachment device according to FIG. 2.

Referring now to the figures of the drawing in detail and first, particularly, to FIG. 1 thereof, there is shown a body 2 of a motor vehicle 1 with a body opening 3, which opening is surrounded by a body shell section 4. A rear hatch cover 6 is pivotally attached via a hinge configuration 7 to the body shell section 4, and in particular to a transversely oriented rear roof frame 5, so that the rear hatch cover 6 is able to close or—as illustrated—is able to uncover the body opening 3. The rear hatch cover 6 closes a luggage compartment 8, which is a part of an interior 9 of a vehicle, which also possesses a passenger compartment 10. The luggage compartment 8 and the passenger compartment 10 are subdivided from one another by a separating element 11, so that non-illustrated objects transported in the luggage compartment 8 are held back in the luggage compartment 8, for example under heavy braking or in the event of an accident, so that the separating element 11 can also be designated as a retaining element for cargo. In conjunction with this, the separating element 11 is held firmly in an upright functional position FS by an attachment device 12, and it is connected securely, yet detachably, to the body shell and in particular to the body shell section 4. The attachment device 12 is executed with a number of parts and preferably possesses a plurality of attachment members 13 and 14, of which two upper attachment members 13 are disposed on the roof frame 5, and two lower attachment members 14 are allocated to a luggage compartment floor 15. The roof frame 5 is covered on its side facing the interior 9 of the vehicle with an interior trim part 16 (see FIG. 2).

The upper attachment members 13 of the attachment device 12 are of identical execution and are explained in greater detail below with reference to FIGS. 2 to 6. Identical parts and parts with an identical effect are provided with the same reference designations in all of the FIGS. 1 to 6. The attachment members 13 contain a mounting part 17, which is secured with a platform-shaped attachment section 18, for example by welding, to the body shell section 4 and in particular to a side 19 of the roof frame 5 facing towards the interior 9 of the vehicle. Extending from the attachment section 18 is a strip-shaped extension section 20, which can be bent slightly away from the side 19, where appropriate, and extends contrary to the direction of travel FR, that is to say in the direction of the luggage compartment 8, and which is transformed into a strip-shaped holding section 21 for the separating element 11, which at its free end 22 carries a hook 23 open in an upward direction, on which the separating element 11 is suspended with an eye 24 (FIG. 1). The length of the extension section 20 and the holding section 21 is dimensioned so that the hook 23 does not project beyond the interior trim part 16. Introduced around the holding section 21 in the interior trim part 16 is a hole 25, into which a cover 26 is inserted, which has a transcurrent opening 27, through which the holding section 21 with its hook 23 passes and, in so doing, penetrates the cover 26. The cover 26 lies at a distance from the body shell section 4 and is attached exclusively to the interior trim part 16, for which purpose at least one element 28 gripping from the rear (FIG. 6) is provided and is described in greater detail below.

The cover 26 possesses a middle piece 29, which is executed similarly to a roof section 30 or a shell. The transcurrent opening 27 is executed with a more or less rectangular form in the roof section 30. The roof section 30 is surrounded by an edge strip 31, which is executed so that it is bent slightly away from the roof section 30. The roof section 30 is thus displaced rearwards in relation to the interior trim part 16, and the edge strip 31 terminates with an edge 32 surrounding the hole 25 on the interior trim part 16. In this way, the hook 23 lies at least for the most part inside the roof section 30.

The cover 26 is secured by the at least one element 28 gripping from the rear, which is executed preferably as a single piece with the latter on a rear side 33 of the cover 26 facing towards the side 19. The element 28 gripping from the rear engages with a nose 34 on the edge 32 of the interior trim part 16. The element 28 gripping from the rear can be made of the same material as the rest of the cover 26. A different plastic can also be used, however. A plurality of elements 28 gripping from the rear can be disposed distributed on the rear side 33. Also disposed peripherally on a rear side 33 is a receiving section 35, which is executed in the form of a channel and runs along the edge strip 31 at least in sections. The receiving section 35 is formed from a step 36 projecting from the rear side 33, which step defines the channel together with the edge strip 31. The cover 26 is pushed onto the edge 32 of the interior trim part 16 with this receiving section 35, as can be clearly appreciated from FIG. 2. Further hook arrangements 26' can be provided in addition on the rear side 33 of the cover 26, which hook arrangements 26' are suspended from the interior trim part 16.

Figure 4:
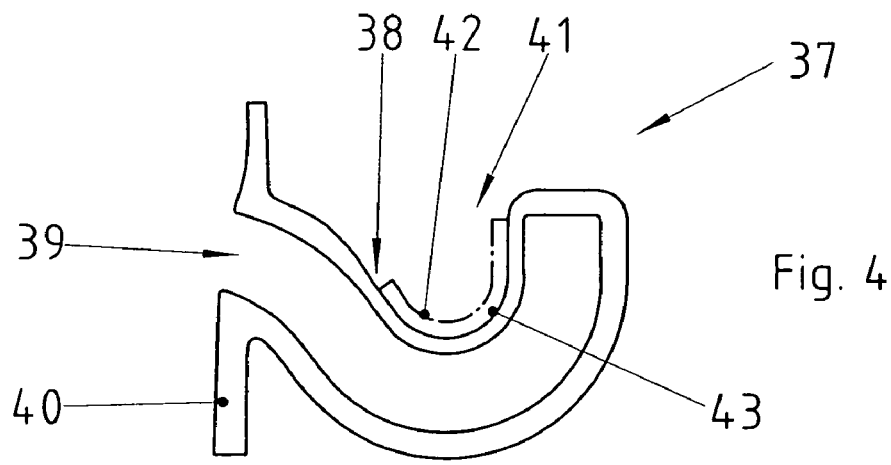
FIG. 4 is a diagrammatic, enlarged sectional view of a second illustrative embodiment of the push-on part.
Figure 5:
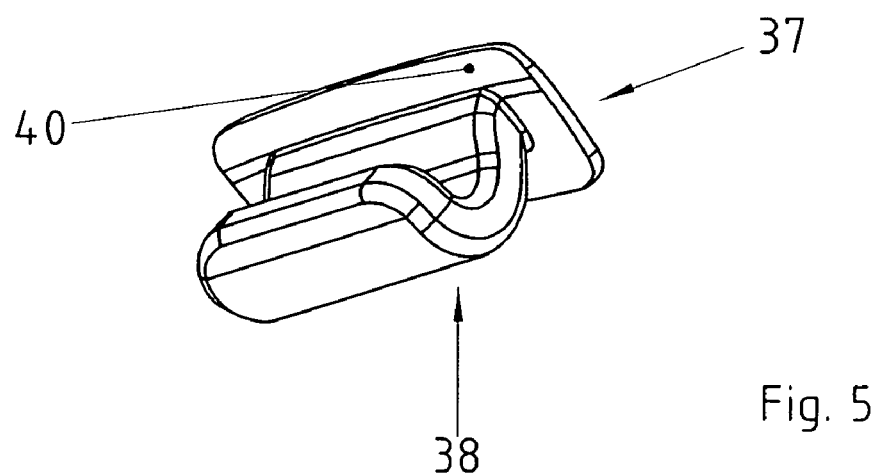
FIG. 5 is a diagrammatic, perspective view of the push-on part.
Figure 6:
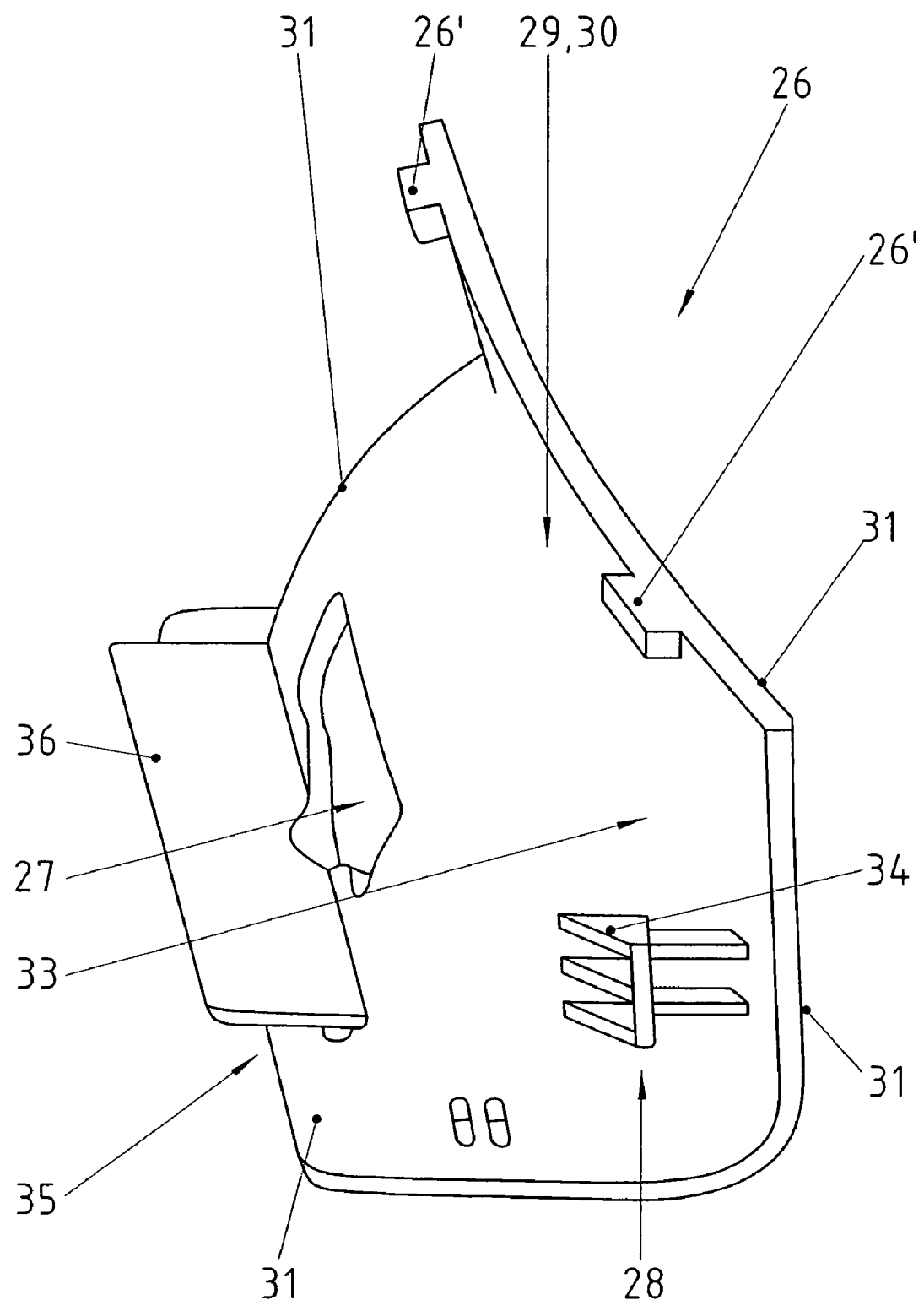
FIG. 6 is a diagrammatic, perspective view of a cover of the attachment device.

Applied to the hook 23 is a covering in the form of a push-on part 37 capable of being pushed onto the hook 23, which push-on part exhibits a hook-shaped part 38 completely surrounding the hook 23, which hook-shaped part is equipped with a push-in opening 39, which is enclosed by a preferably surrounding collar 40 (FIG. 4). As can be appreciated from FIGS. 2 and 3, the collar 40 is in contact with the rear side 33 of the cover 26 and thus engages with this from behind.

The hook-shaped part 38 is adapted to the form of the hook 23 and forms a skin, as it were, on the hook 23. In an application area 41 for the eye 24, the push-on part 37 can exhibit a reinforcement 42 (FIG. 4) on its hook-shaped part 38, which reinforcement can be provided in a single piece with the push-on part 37 or as an additionally applied layer 43, preferably made of the same material as the push-on part 37.

Both the push-on part 37 and the cover 26 conceal the mounting part 17 and are made from an elastic plastic material. Envisaged for the push-on part 37 and the reinforcement 42 is a thermoplastic elastomer with a hardness of ca. 87±5 Shore A, which is known under the trade name SANTOPRENE. An elastomer, in particular EPDM, is used for the cover 26. If necessary, the cover 26 can also be executed as a two-component part. For example, the element 28 gripping from the rear and/or the edge strip 31 and/or the roof sections 30 and/or the step 36 could be made of a different plastic, for example polypropylene.

We claim:

1. A motor vehicle, comprising:
   a body shell section;
   an interior trim part covering said body shell section and having a hole formed therein;
   a separating and retaining element;
   an attachment device supporting said separating and retaining element, said attachment device having a mounting part with an attachment section secured to said body shell section, a holding device formed as a hook, and an extension section disposed between said holding device and said attachment section, said hook having a covering made of plastic and formed as a part which is pushed on and
   a cover inserted into said hole of said interior trim part, said holding device passing through said cover, said cover attached exclusively to said interior trim part and said cover lies at a distance from said body shell section, said hook together with said cover concealing said attachment device.

2. The motor vehicle according to claim 1, wherein said part which is pushed on is manufactured from an elastic plastic.

3. The motor vehicle according to claim 1, wherein said cover is manufactured from an elastic plastic.

4. The motor vehicle according to claim 1, wherein said cover has at least one element gripping from a rear for its attachment to said interior trim part.

5. The motor vehicle according to claim 1, wherein:
   said interior trim part has an edge delimiting said hole; and
   said cover has at least one receiving section disposed peripherally, and is pushed onto said edge of said interior trim part delimiting said hole.

6. The motor vehicle according to claim 1, wherein said cover has an edge strip and a middle piece functioning as a roof section and surrounded by said edge strip, said roof section has a transcurrent opening formed therein for receiving said hook.

7. The motor vehicle according to claim 1, wherein said part which is pushed on has a collar engaging said cover from behind.

8. The motor vehicle according to claim 1, wherein said part which is pushed on has an application area and a reinforcement disposed in said application area.

9. The motor vehicle according to claim 2, wherein said elastic plastic is a thermoplastic elastomer.

10. The motor vehicle according to claim 3, wherein said elastic plastic is at least one of an elastomer and a polypropylene.

11. The motor vehicle according to claim 1, wherein said separating and retaining element is a luggage grille.

12. In a motor vehicle having a body shell section, an interior trim part covering said body shell section and having a hole formed therein, and a separating and retaining element, an attachment system for securing the separating and retaining element, the attachment system comprising:

an attachment device for the separating and retaining element, said attachment device having a mounting part with an attachment section secured to the body shell section, a holding device formed as a hook, and an extension section disposed between said holding device and said attachment section, said hook having a covering made of plastic and formed as a part which is pushed on; and a cover inserted into said hole of said interior trim part, said holding device passing through said cover, said cover attached exclusively to said interior trim part and said cover lies at a distance from the body shell section, said hook together with said cover concealing said attachment device.

* * * * *